J. R. Grout,
Metal Drill,
Nº 3,564.   Patented Apr. 25, 1844.
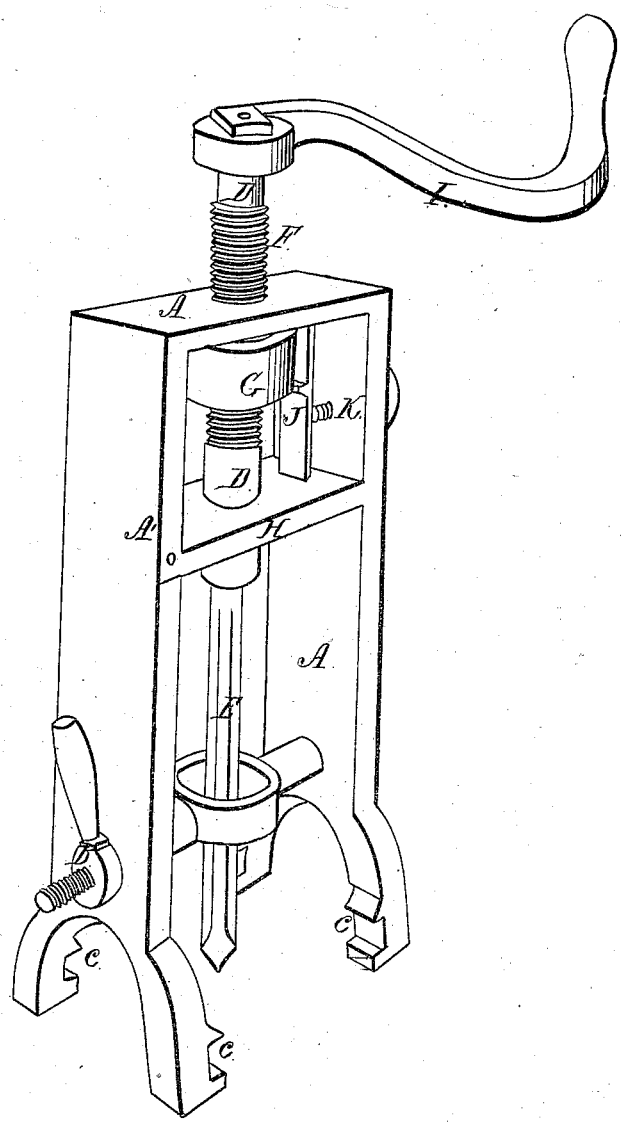

UNITED STATES PATENT OFFICE.

JOHN R. GROUT, OF BIRMINGHAM, MICHIGAN.

MANNER OF GOVERNING THE FEED OF A DRILL OR BORER FOR METALS AND OTHER SUBSTANCES.

Specification of Letters Patent No. 3,564, dated April 25, 1844.

*To all whom it may concern:*

Be it known that I, JOHN R. GROUT, of Birmingham, in the county of Oakland and State of Michigan, civil engineer, have invented a new and useful improvement in the manner of governing the feed of drills or borers for the drilling or boring of metals or other articles requiring to be drilled or bored and which may also be applied to other purposes; and I do hereby declare that the following is a full and exact description thereof.

In the accompanying drawings I have given several exemplifications of the manner in which the principle upon which the action of my apparatus is dependent may be advantageously applied, and from which any competent machinist will be enabled to adapt it to instruments of other forms.

Figure 1 shows a drill and a stock, or frame, so formed as to suit it to the drilling of railroad bars, the tire of wheels, and other articles which it is fitted to embrace.

A, A, is the frame which is to hold the drill and its appendages. One side of this frame is represented as having a hinge joint at A′, and a tightening screw at B. The notches C, C, at the lower end of the frame are intended to embrace the bar, or piece to be drilled. Under this construction of the instrument it may be applied to a railroad bar without the necessity of removing it from the track; the broken ends, or other part to be drilled being raised sufficiently to pass into the notches C, C.

D, D, is a mandrel or shaft, which has a socket in its lower end to receive the drill E. The mandrel D, has a screw F, cut upon it which works through a female screw in what I denominate a friction nut, G. The opening through which it passes in the top of the frame is not tapped, but is of such size as to allow the screw to pass easily through it, and it operates therefore as a mere guide to the mandrel, as does the cross-bar, or brace H. The mandrel may be turned by means of a winch I, or in any other convenient manner.

The friction nut G, I usually make eccentric; that is, supposing its periphery to be cylindrical, the screw hole through it is bored a little out of the axis of the cylinder; or said nut may be made elliptical if preferred. The object of this eccentricity, or deviation from a cylindrical form, is to increase the friction to which its periphery is to be subjected; the nut may be made cylindrical, with the screw through its axis, and friction may be applied to it, but less advantageously than when it is eccentric.

J, is a friction piece, which may be forced up against the periphery of the nut G, by means of a thumb screw K. The piece J, is made of steel, and tempered so as to possess some elasticity, and operate as a strong spring, as well as to make friction. Between the top of the nut G, and the head of the frame, I place a washer of steel or other metal, which may be renewed when necessary; this serves to protect the frame and nut from undue friction and wear, and allows the feed to be more perfectly regulated by the friction piece.

The operation of this apparatus is as follows. The nut G, it is manifest, would, if unobstructed, revolve with the mandrel D; and were the nut held stationary the mandrel would advance at every revolution to a distance equal to that of the width of the thread of the screw upon it. By means of the friction piece K, the revolution of the nut G, may be obstructed to any required extent, and such a balance may be established between the resistance produced by the cutting of the drill, or borer, and the friction to which the nut is subjected, as will enable the operator to govern the feeding with perfect precision; should the article to be bored be hard, the friction on the nut may be increased so as to compel the drill, or borer, to take hold on it with any degree of force, and should the feed be too rank the lessening of the friction upon the nut will instantaneously regulate it.

Figs 2, and 3, represent the apparatus in the form of a bench drill, placed horizontally; Fig. 2, being a side elevation, and Fig. 3, a top view thereof. L, is the base, or bottom plate, by which it may be affixed to the bench. M, is a sliding standard against which the piece to be drilled, or bored, is to be held; the other parts are lettered as in Fig. 1.

Fig. 4 is a side elevation of a similar bench drill, in which the friction apparatus is arranged in a manner differing from that shown in the other figures. N, is a sliding or friction wedge, the face of which is shown at N′; which wedge may be made to press with greater or less force upon the outer face of the nut G'; this pressure being regulated by the thumb screw K. Such form is given to the frame as to constitute a proper bearing for the wedge, as shown at O. The requisite elasticity is given by means of a spring P, the face of which is shown at P'. This spring P, occupies the place of the washer in Fig. 1; and it operates advantageously upon the drill by forcing it forward with a yielding pressure; such a spring may be applied to the apparatus represented in Figs. 1 and 2. The parts not peculiar to this arrangement are designated by the same letters as in the preceding figures. The friction piece J, Figs. 1, and 2, may be applied to this instrument, in combination with the spring P, if desired.

Fig. 5 shows a drilling or boring apparatus in the form of a brace, in which the same principle of action obtains. The part I', in this case takes the place of the winch I, in the other instruments. The mandrel upon which the screw F, is cut is received within a cylindrical hollow case R, having a head S, which may be sustained against a beam, or in any other convenient manner. J, is the friction piece which may be made to bear with any required degree of force against the nut G, by means of the screw K, which is tapped into the case R. The friction nut may be applied to most of the instruments used for drilling and boring, and these may, in general, be much simplified by its adoption. In lathes, and other similar apparatus, where the feed in drilling, boring or turning is regulated by a guide screw, and a gearing of cog-wheels and pinions, this gearing may be dispensed with, and my friction nut and friction piece applied so as to give the required feed; which in addition to its simplicity, has the advantage, at the same time, of being self regulating, by yielding to any unusual obstruction.

Having thus fully described the nature of my invention, and shown the manner in which the same may be carried into operation, what I claim therein as new and desire to secure by Letters Patent, is—

The employment, substantially in the manner, and under the combination herein made known, of a friction nut, and friction piece, so as to operate upon the mandrel, or regulating screw, or shaft, of a drilling, boring or other machine requiring a similar kind of feed; and this I claim whether such machine be made in either of the forms represented in the accompanying drawings, or in any other where the same principle may be applied by equivalent means.

JOHN R. GROUT.

Witnesses:
 WM. H. BISHOP,
 THOS. P. JONES.